United States Patent [19]

Vujnovic

[11] Patent Number: 5,577,669
[45] Date of Patent: Nov. 26, 1996

[54] APPARATUS AND METHOD FOR THE BENEFICIATION OF ORE AND COAL WITH THE AID OF ULTRASOUND

[76] Inventor: J. Bradley Vujnovic, 67194 Country Club Rd., Saint Clairsville, Ohio 43950

[21] Appl. No.: 388,744

[22] Filed: Feb. 15, 1995

[51] Int. Cl.⁶ .................................................. B02C 19/18
[52] U.S. Cl. ........................... 241/1; 241/21; 241/23; 241/29; 241/285.2; 241/301
[58] Field of Search .............................. 241/1, 21, 301, 241/20, 24, 27, 23, 285.2; 44/904, 280, 281, 282

[56] References Cited

U.S. PATENT DOCUMENTS

| | | | |
|---|---|---|---|
| 3,207,447 | 9/1965 | Whitham | 241/1 |
| 3,545,683 | 12/1970 | Schulte | 241/1 |
| 3,811,623 | 5/1974 | Speer | 241/1 |
| 4,156,593 | 5/1979 | Tarpley | 241/1 X |
| 4,313,573 | 2/1982 | Goldberger et al. | 241/1 |
| 4,391,608 | 7/1983 | Dondelewski . | |
| 4,537,599 | 8/1985 | Greenwald | 241/1 X |
| 4,557,467 | 12/1985 | Kuhn et al. | 241/1 X |
| 4,919,807 | 4/1990 | Morton et al. . | |
| 5,035,363 | 7/1991 | Somoza | 241/1 |
| 5,087,379 | 2/1992 | Morton et al. . | |
| 5,351,899 | 10/1994 | Koenig | 241/285.2 X |

FOREIGN PATENT DOCUMENTS 246706  6/1987  Germany ................................. 241/1

*Primary Examiner*—Mark Rosenbaum
*Attorney, Agent, or Firm*—Webb Ziesenheim Bruening Logsdon Orkin & Hanson, P.C.

[57] ABSTRACT

An apparatus for treating a slurry with ultrasound to improve separation based upon specific gravity comprises a plurality of modular conduit units having substantially vertical walls defining a flow space through which a slurry may be pumped. Each modular conduit unit has mounted thereon ultrasound transducers for transmitting ultrasound energy into the slurry being pumped through the modular conduit unit and means for exciting the ultrasound transducers in a frequency range of 60 to 100 kHz.

16 Claims, 3 Drawing Sheets

APPARATUS AND METHOD FOR THE BENEFICIATION OF ORE AND COAL WITH THE AID OF ULTRASOUND

BACKGROUND OF THE INVENTION

Valuable materials are extracted from ores by beneficiation processes. One beneficiation process comprises washing wherein the valuable materials are separated from the undesired materials on the basis of specific gravity difference by first forming a slurry of the crushed ore. Essential to any process of separation based upon specific gravity difference is the physical separation of the valuable materials and the undesired materials in the slurry. This application is directed to washing processes improved by better separation in the slurry brought about by the efficient application of ultrasound energy to the slurry. Coal washing is one example of beneficiation by a separation based upon specific gravity difference between the valuable and the undesired materials.

Coal, as a fuel, is an abundant resource of energy comprised mostly of carbon and small percentages of hydrogen, sulfur and ash. When coal is burned to produce energy, the presence of sulfur and ash is generally undesirable. The ash enters the atmosphere as small particles (particulates) and the sulfur as noxious sulfur oxide gases. In the Appalachian coal fields, conventional coal mining operations have traditionally refined useful coal by washing from it less valuable sand and clay, although fine particles of coal are often agglomerated with the residues produced by coal washing processes. Because fine coal remains a part of these residues, so-called "gob piles" and coal slurry ponds of residues have accumulated throughout the coal fields adjacent to coal washing yards. These stock piles are rich in fine particles of useful coal. In the past, it has proved to be economically impractical to recover this coal.

Sulfur is present in coal in three principal forms: pyritic sulfur (a combination of iron and sulfur), sulfate sulfur and organic sulfur, that is, chemically combined sulfur within the coal structure. Pyritic sulfur can, to a large extent, be washed out of coal by conventional coal washing methods. These methods are not, however, suitably efficient on a large scale and, at best, only a small portion of the mined coal can be sufficiently upgraded by washing alone. Sulfate sulfur can be separated from coal by dissolving it in water. For example, it may be boiled out of the coal matrix by elevated temperature processes which have already been developed. At the present time, there appears to be no commercial process for removing substantial amounts of organic sulfur from coal.

Numerous processes have been proposed for upgrading coal to remove various forms of sulfur. The following have been considered: (1) oxidation of sulfur in the coal in an aqueous medium to form soluble sulfates; (2) reduction of the sulfur to elemental sulfur in which form it can be vaporized or removed by organic solvents; (3) reaction with hydrogen to form gaseous hydrogen sulfide; (4) vapor deposition selectively on the pyritic form of sulfur followed by magnetic separation of the pyrites; (5) oxidation of the sulfur with nitric oxide vapors to form gaseous sulfur oxides; (6) leaching with a sodium and calcium oxide lixiviant; and (7) leaching with aqueous ferric sulfate.

Ultrasound treatment of coal slurries has been demonstrated to be useful in coal washing processes as disclosed, for example, in U.S. Pat. Nos. 4,391,608 and 4,919,807. Typically, the slurry is passed through a substantially horizontal trough to which ultrasound transmitters are attached.

The applicant's process disclosed herein is directed to the removal of one or more of the three basic forms of sulfur from coal and coal-like materials. At the same time, the process reduces the amount of ash within the coal or coal-like material. The recovery of useful coal is improved and the ability of the coal product to shed water is increased. The process involves the use of atmospheric pressures and low temperatures (temperature near room temperature) and may be practiced with rugged processing equipment. Further, the process improves the characteristics of the residue thereby enhancing their disposition and reducing problems with their disposal and allowing potential beneficial uses of them.

It should be understood that the processes and apparatus disclosed herein have application not only to coal washing but also to the beneficiation of mineral ores, for example, gold ore and tailings from gold ore beneficiation, wherein the valuable materials and gangue (unwanted materials) can be separated on the basis of specific gravity difference. Indeed, in some ways these processes and apparatus have greater application to separation of heavier and more abrasive materials than raw coal. An additional advantage of this invention is the minimization of the abrasive action of the slurry on the apparatus for applying ultrasound to the slurry.

The inventor does not wish to be limited by any particular theory of operation but it is understood that sound waves in liquids comprise expansion cycles and compression cycles. During the expansion cycle, the molecules of the liquid are separated creating a gap or "cavity" in the liquid. The cavity only exists until the next compression cycle at which time the cavity rapidly implodes. This implosion creates a microscopic jet directed at or along the surface of solids within the liquid and also rapidly heats the liquid surrounding the cavity (which is almost instantaneously cooled by the large mass of liquid). The combination of extremely hot liquid and microscopic jets work upon the surfaces of the solids.

In the past, ultrasound energy having frequencies in the range of about 10 to 50 kHz have been suggested for treatment of coal slurries. This was based in part upon the expected attenuation of sound energy as it progresses into the slurry. The higher the frequency, the more rapid the attenuation. According to the invention disclosed herein, much higher frequencies are contemplated. The doubling of frequency doubles the number of locations within the slurry about which cavitation and implosion take place, thus increasing the action of the ultrasound on smaller and smaller particles because the implosion locations are closer to one another.

SUMMARY OF THE INVENTION

Briefly, according to this invention, there is provided a method and apparatus for treating an ore slurry with ultrasound to improve separation based upon specific gravity. The invention comprises passing the ore slurry vertically through a conduit and applying ultrasound energy to the slurry passing through the conduit having frequencies in the range of 60 to 100 kHz, preferably 70 to 90 kHz.

A specific embodiment of this invention comprises a method for treating coal to reduce the ash and sulfur content and for improving the characteristics of a resulting residue. The method comprises a first step for combining the coal with water to form a slurry, a second step for applying ultrasound of a frequency between 60 and 100 kHz, preferably about 80 kHz, to said slurry which breaks the physical bonds of ash and sulfur from the coal and a third step for physically separating the ash and sulfur from the coal to recover coal with reduced sulfur and ash content by using such devices as cyclone separators, spiral separators, vibrating screens or centrifuge separators. Preferably, the coal is first crushed and sized to pass a one-quarter inch mesh screen. It is preferred that the temperature of the slurry is maintained less than 75° C. According to a preferred method, the weight ratio of coal to water in the slurry comprises between 1:20 and 1:3.

There is also provided, according to this invention, an apparatus for treating a slurry prior to separation based upon specific gravity, for example, to separate coal from contaminants containing ash and sulfur. The apparatus comprises a plurality of modular conduit units having substantially vertical walls defining a flow space through which the slurry may be pumped. Each conduit unit has mounted thereon ultrasound transducers for transmitting ultrasound energy into the slurry being pumped through the conduit unit. An electrical power supply is provided for exciting the ultrasound transducer units in a frequency range of 60 to 100 kHz, preferably 70 to 90 kHz. Preferably, the conduit units have a section perpendicular to the direction of flow of slurry such that no volume of the slurry passes through the conduit more than about three inches from a transducer and preferably two inches from the transducer. Preferably, the modular units are arranged with flanges at the top and bottom that enable connecting them to adjacent modular units or inlet and outlet conduits for carrying slurry to and from the apparatus. In an especially preferred embodiment, each conduit unit has a rectangular cross section with transducers mounted on at least two opposing walls. Preferably, according to this invention, there is provided a pump for pumping slurry through the conduit at a rate of about 2 feet per second. In an especially preferred embodiment of this invention, a pump is connected to the-modular conduit unit such that slurry is pumped up through the conduit units.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
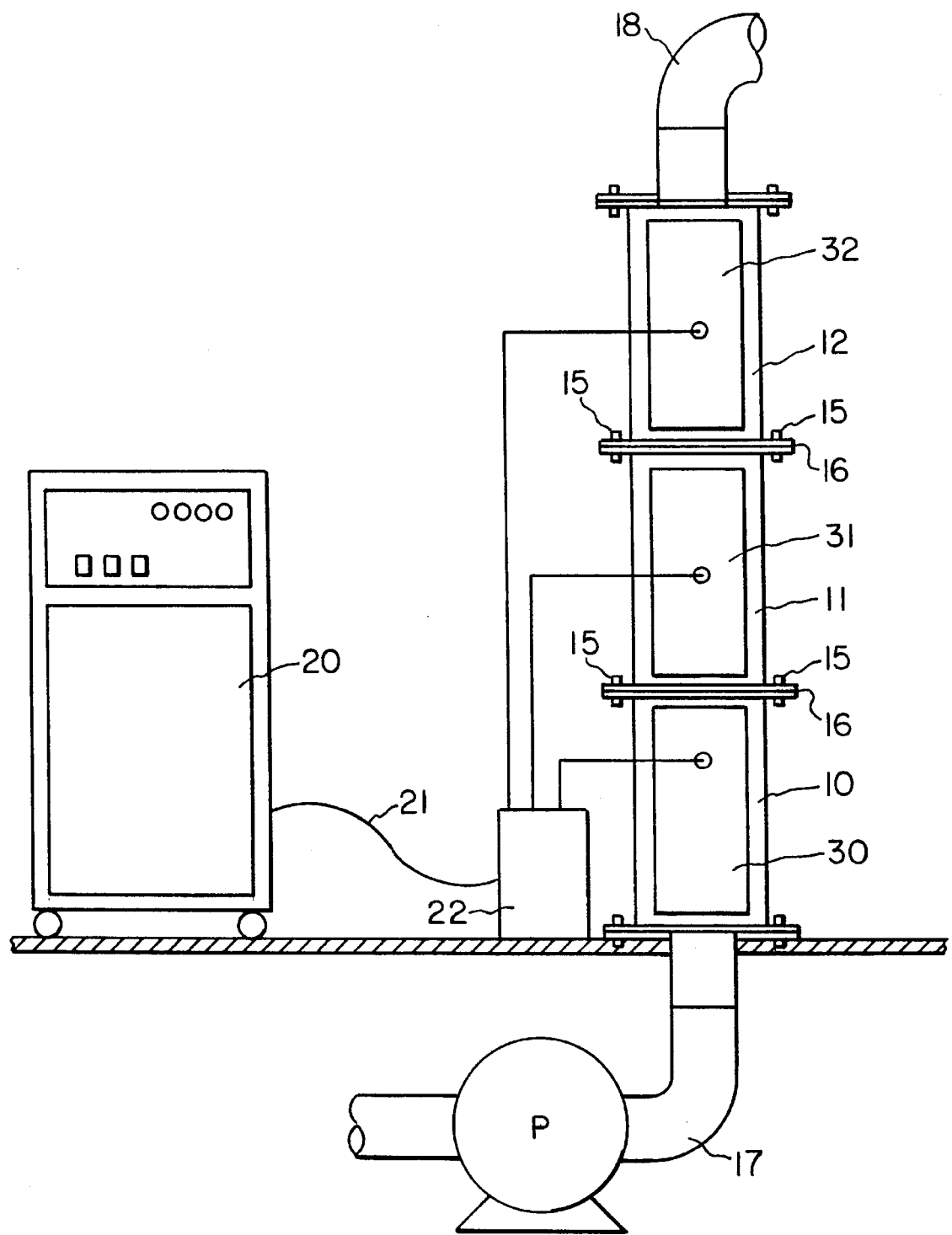
FIG. 1 is a schematic view of a unit for treating a slurry with ultrasound according to this invention comprising three modular conduit units with internally mounted transducer units.

The techniques of this invention provide effective and economic methods for beneficiating crushed or granulated coal fines by reducing the sulfur and ash (e.g., sand and clay) content. In the case of coal gob piles and coal slurry ponds, it achieves efficient recovery of valuable coal while also improving the characteristics of the remaining residue for densely packed backfilling of coal mining pits, open or underground, and filling the voids of the underground excavations to prevent subsidence and reducing the settling times for ponds and settling basins to produce clarified wash water for recycling or other uses.

The first step of this method requires crushing and preferably sizing the coal to a more or less uniform size. A particular size to be selected depends upon the type of coal and the amount of sulfur that must be removed and, of course, the type of sulfur within the coal itself. Certain coals have been found to respond to treatment very well if crushed to pass a one-quarter inch mesh screen. It should be understood that the process described herein can be used for the treatment of residue from coal washing processes sometimes referred to as pond coal, in which case the starting material is already very fine, say minus 28 mesh Tyler. In this instance, it is not necessary to crush and size the coal starting material. The second step comprises combining the coal with water in a bath to form a slurry. A third step involves applying ultrasound to the slurry. This is done by continuously pumping the slurry through an ultrasound cell where it is resident for only a relatively short period of time. A fourth step comprises physical separation to recover a coal with a reduced sulfur and ash content and then removing the coal from the water.

In using ultrasonics in connection with liquids, normally, cavitation will occur in liquids and is produced by transducer acceleration pressures against the liquid slurry. Cavitation is the formation of partial vacuums within the liquid. Ultrasonically induced cavitation appears to promote chemical as well as physical changes of substances within the liquid to which the sound is applied. An important aspect of this invention is the provision of a unique unit for applying ultrasound to a coal slurry wherein the coal slurry is passed through the ultrasound unit in a substantially vertical direction and ultrasound waves having a frequency on the order of 80 kHz (60–100 kHz) are transmitted into the slurry by transducers mounted on the substantially vertical walls of the unit. For ultrasonic treatment, when water is used as a treatment medium, cavitation and agitation may both be involved. Temperature affects the speeds and frequency of ultrasonic waves within a given medium. Generally, at about a temperature of 73° C., cavitation and frequency of ultrasonic waves within water begin to deteriorate. It is, therefore, desirable to keep the slurry below 73° C.

The ultrasonic waves created in the slurry as it passes through the ultrasound unit result in breaking the physical bonds of the fine coal particles from the particles of ash or sulfur compounds. After the physical bonds are severed by this ultrasonic treatment, physical separation using a cyclone has been found to be highly effective and the coal particles are also found to be cleaned by the ultrasonic treatment. This also increases the number of BTUs recoverable per pound. The amounts of retained water in the recovered constituent are also decreased as compared to other recovery systems and fine pyritic and organic sulfur constituents are decreased.

The "gob piles" remaining after conventional coal washing operations may contain from 25% to 50% coal particles. After this refuse material is optionally crushed and screened to pass a one-quarter inch mesh screen, it is ready for treatment in the apparatus of the present invention, permitting recovery of as much as 70% or more of the coal in the gob pile and slurry ponds.

The same technique can be used to separate gold and other valuable minerals from crushed ore. The ultrasonic energy breaks the surface tension bonds between mineral particles and ash/clay particles and any air bubbles, gels, slime or algae causing particles to adhere together. This process may be called microscopic scrubbing of the particles and it produces unusually clean particle surfaces, stripped of foreign material and carrying much less moisture than before.

Self-compaction of these ultrasonic scrubbed fine particles, unimpeded by air bubbles, gel particles or other foreign coatings, leads to denser filter cakes or sludge layers. It will be understood that the rates of screening, filtration, conveying, heat transfer and drying of the resulting scrubbed fine particles are all enhanced by these processes of the invention and the effective recovery of mineral particles from crushed ore slurries are significantly improved.

Finally, subsequent operations such as centrifugal separation steps are made more efficient when they are performed on the slurries treated in the ultrasound unit of this invention.

Once the mineral constituents are treated as in the present invention, the minerals and residue follow more closely Stokes law in settling in calm water. Stagnant ponds of gangue, tailings, coal and other materials often contain gelatinous material which encase the small solid particles. Ultrasound disintegrates and separates the water-gel layer and also algae from these small solid particles. The microscopic scrubbing action is believed to account for many of the advantages of the ultrasonic cleaning process. For example, with the surface tension removed, the dewatering rate and the sedimentation or settling rate for resulting fine particles are notably improved after the ultrasonic treatment of these slurries. This leads to rapid clarification of settling basins and pond water because of this enhanced clean separation of mineral particles from each other and from gel, algae and the like. The rapid settling of the fines enables larger amounts of coal to be washed by a coal processing plant because the clarifier can process the waste material much more efficiently. The rate of screening these clean fine particles is also improved following this ultrasonic treatment of slurries and clogging buildups of fines on screens is greatly reduced when the fine particle surfaces are cleaned in this manner. In all cases, the clarification of the pond water is greatly improved and in some cases the settling rates for the fines are increased as much as ten times. Chemical additives such as flocculating agents are made significantly more efficient by these processes. For example, when they are used with the processes of this invention, the normal amounts of flocculants may be reduced by as much as 80% to 95% without adversely affecting the operating results.

Apparatus

Referring now to FIG. 1, there is shown a schematic view of a unit for treating a slurry with ultrasound. The unit comprises a column of three modular conduit units 10, 11 and 12 having flanges on each end enabling them to be joined together by fasteners 15 which clamp rubber gaskets 16 between the flanges to seal the modular units together. The modular design has a beneficial benefit in that the length of the column comprised of modular units can be extended when necessary to increase the amount of ultrasound energy applied to the slurry. A column of modular units is connected at one end to an intake conduit 17 which is in communication with a pump P that draws slurry to be processed from a sump or the like. The column is connected at the upper end to an outflow conduit 18 which connects the ultrasonically treated slurry to the cyclone separators (not shown) or the like. A power supply 20, a cable 21 which may extend up to 30 feet, and a quick disconnect box 22 supply electrical energy to the ultrasound transducers 30, 31 and 32 mounted in each modular conduit unit. The modularity of the conduit units and the quick disconnect box enable the rapid replacement of modular units when maintenance is required minimizing the down time of the coal washing plant.

Figure 2:
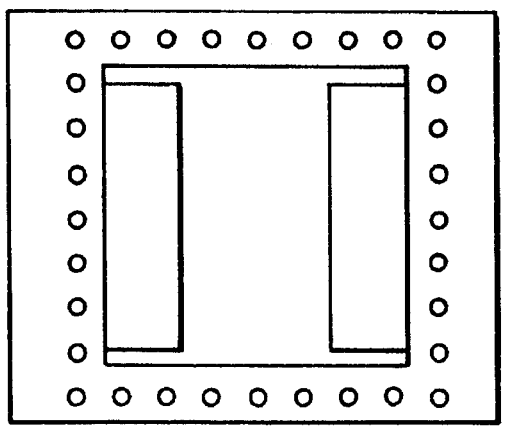
FIG. 2 is a top view of one modular unit shown in FIG. 1.
Figure 3:
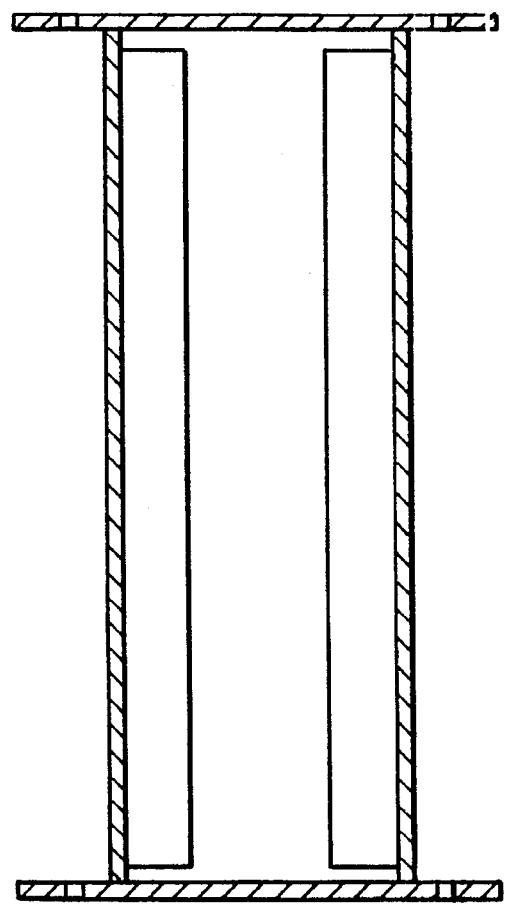
FIG. 3 is a side view in section of one modular unit shown in FIG. 2.

Referring now to FIG. 2, there is shown top and bottom sections of modular units having immersible ultrasound transducers mounted therein. The transducer units are hermetically sealed containers having a plurality of piezoelectric crystals mounted therein. According to a preferred embodiment, each immersible transducer unit is capable of outputting 7,200 watts peak output power.

Figure 4:
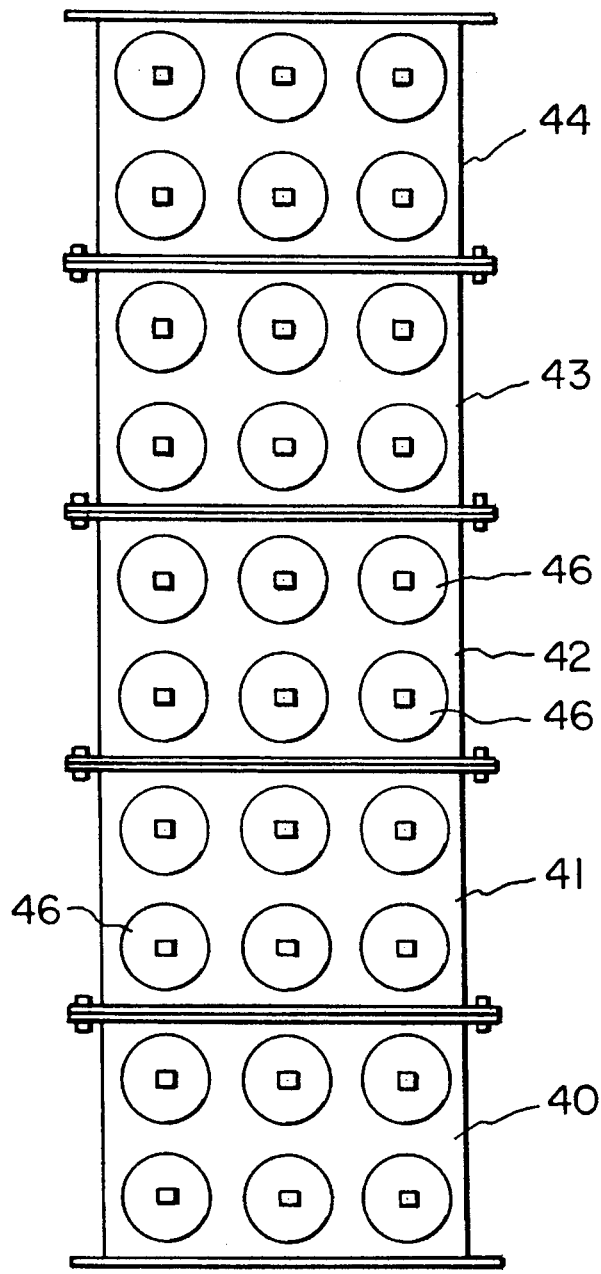
FIGS. 4 and 5 are front and side views, respectively, of a modular conduit unit for treating a slurry with ultrasound comprising five modular conduit units with externally mounted transducer units.
Figure 5:
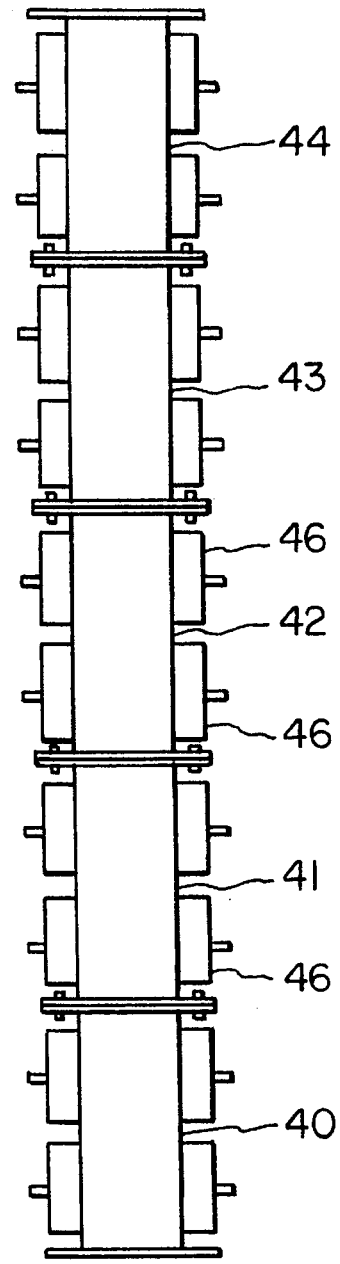

Referring now to FIGS. 4 and 5, there is shown in front and side view a column comprised of modular conduit units 40, 41, 42, 43 and 44 having the ultrasound transducers 46 mounted on the exterior thereof.

COMPARATIVE TESTING

EXAMPLE I

Gob pile coal was processed according to this invention. The raw coal had the following analysis after drying:

| | |
|---:|:---|
| ash: | 43.90 wt. % |
| volatile matter: | 14.05 wt. % |
| fixed carbon: | 42.05 wt. % |
| Total: | 100% |
| sulfur: | 2.18 wt. % |
| heat content (BTU/pound): | 8,175 |

This coal is far from complying with environmental regulations in the United States. To be a compliance coal, a coal must have less than 0.72 weight percent sulfur at a heat content of 12,000 BTU per pound.

This coal in slurry form was processed as follows and separated in a cyclone separator.

| | |
|---:|:---|
| length of ultrasound column: | 66 inches |
| width of column: | 4 inches |
| frequency of ultrasound: | 80 kHz |
| total power: | 7,200 × 3 watts |
| flow rate of slurry: | 2 feet per second |
| direction of flow: | upward |

Two samples were dried after separation and were analyzed as follows:

| | Sample 1 | Sample 2 |
|---:|:---|:---|
| ash: | 13.41 wt. % | 12.51 wt. % |
| sulfur: | 0.86 wt. % | 0.88 wt. % |
| heat content (BTU/pound): | 13,457 | 13,630 |

With adjustment of the cyclone separator, it would be expected that the ash could be further reduced as with the following example. This product with typical moisture would be near compliance and with the ash further reduced, it would be brought into compliance.

EXAMPLE II

In yet another test, the coal taken from a pond was analyzed as follows:

|  | Sample 3 | Sample 4 |
|---|---|---|
| ash: | 45.27 wt. % | 52.8 wt. % |
| sulfur: | 3.38 wt. % | 3.46 wt. % |

Materials from which Samples 3 and 4 were taken were combined, crushed to all pass ¼" and passed through the apparatus as described above in Example I with and without the ultrasound turned on. The slurry was separated in the laboratory on the basis of a specific gravity of 1.45. The results were as follows:

|  | 80 kHz ultrasound on | no ultrasound |
|---|---|---|
| ash: | 8.6 wt. % | 11.08 wt. % |
| sulfur: | 0.77 wt. % | 1.15 wt. % |
| recovery: | 38.7 wt. % | 27.47 wt. % |
| heat content (BTU/pound): | 14,238 | 13,676 |

Examples I and II establish the substantial benefit of processing slurries according to the teachings of this invention. Referring to Example II (ultrasound on), not only is the product lower in ash and sulfur content resulting in a compliance coal product, but the amount of clean coal recovered is increased by 40%. This, in itself, is a substantial advantage of applicant's method.

Having thus described my invention with the detail and particularity required by the Patent Laws, what is claimed to be protected by Letters Patent is set forth in the following claims.

I claim:

1. An apparatus for treating a slurry with ultrasound to improve separation based upon specific gravity comprising:

a plurality of modular conduit units assembled one above the other having substantially vertical walls defining a conduit having a flow space through which a slurry may be vertically pumped;

each said modular conduit unit having mounted thereon ultrasound transducers for transmitting ultrasound energy into the slurry being pumped through said modular conduit unit wherein the conduit has a section perpendicular to the direction of flow such that no volume of slurry passing through the conduit passes more than about three inches from a transducer;

means for exciting the ultrasound transducers; and a pump for pumping slurry through the conduit, wherein the pump for pumping slurry through the conduit pumps the slurry vertically and upwardly through the conduit.

2. An apparatus for treating a coal slurry to separate coal from ash and sulfur containing contaminants comprising:

a plurality of modular conduit units assembled one above the other having substantially vertical walls defining a conduit having a flow space through which a coal slurry may be vertically pumped;

each said modular conduit unit having mounted thereon ultrasound transducers for transmitting ultrasound energy into a coal slurry being pumped through said modular conduit unit wherein the conduit has a section perpendicular to the direction of flow such that no volume of slurry passing through the conduit passes more than about three inches from a transducer;

means for exciting the ultrasound transducers; and a pump for pumping slurry through the conduit, wherein the pump for pumping slurry through the conduit pumps the slurry vertically and upwardly through the conduit.

3. An apparatus according to claims 1 or 2, wherein each modular unit has attachment flanges at top and bottom that enable connection to adjacent modular units or inlet and outlet conduits for carrying slurry to and from the apparatus.

4. An apparatus according to claims 1 or 2, wherein each conduit unit has a rectangular cross section with transducers mounted on at least two opposing walls.

5. An apparatus according to claims 1 or 2, capable of pumping slurry through the conduit at a rate of about 2 feet per second.

6. An apparatus according to claims 1 or 2, wherein the length of the modular units in the flow direction is about 20 inches.

7. An apparatus according to claims 1 or 2, wherein the transducers in the modular units and the means for exciting the transducers input at least 7,200 watts per modular unit.

8. The apparatus according to claims 1 or 2, wherein the means for exciting the ultrasound transducer excites them in a frequency range of 60 to 100 kHz.

9. A method of treating coal to reduce ash and sulfur content and improving the characteristics of resulting residue comprising the steps for:

(a) combining the coal with water to form a slurry;

(b) pumping the slurry through a substantially vertical conduit while applying ultrasound to said slurry to cause separation of ash and sulfur from coal, wherein the slurry is pumped vertically and upwardly through the vertical conduit; and (c) physically separating coal from the slurry to separate ash and sulfur from the coal to recover coal with reduced sulfur and ash content.

10. A method according to claim 9, wherein the coal is first crushed and sized to a more or less uniform dimension.

11. A method according to claim 9, wherein the temperature of the slurry is maintained less than 73° C.

12. The method according to claim 9, wherein the weight ratio of coal to water in the slurry comprises between 1:20 and 1:3.

13. A method of treating mineral ores including a valuable mineral fraction and a worthless gangue fraction comprising the steps for:

a) combining the ores with water to form a slurry;

b) pumping the slurry through a substantially vertical conduit while applying ultrasound to said slurry, wherein the slurry is pumped vertically and upwardly through the vertical conduit; and c) physically separating the valuable mineral fraction from the gangue fraction.

14. A method according to claim 13, wherein the ore is first crushed and sized to a more or less uniform dimension.

15. A method according to claim 13, wherein the temperature of the slurry is maintained less than 73° C.

16. The method according to claims 9 or 13, wherein the means for exciting the ultrasound transducer excites them in a frequency range of 60 to 100 kHz.

* * * * *